United States Patent [19]
Schwartz

[11] Patent Number: 5,851,267
[45] Date of Patent: Dec. 22, 1998

[54] SEAL ARRANGEMENT FOR RAPID INTERCONNECTION OR AXIALLY ARRANGED SEPARATION ELEMENTS

[75] Inventor: A. William Schwartz, Upland, Calif.

[73] Assignee: UOP LLC, Des Plaines, Ill.

[21] Appl. No.: 789,975

[22] Filed: Jan. 28, 1997

[51] Int. Cl.[6] .................................................. B01D 53/22
[52] U.S. Cl. .................................... 96/7; 96/9; 210/321.8; 210/323.2
[58] Field of Search .................................. 96/4, 7, 9, 10; 210/321.79, 321.8, 321.89, 321.9, 323.2

[56] References Cited

U.S. PATENT DOCUMENTS

| | | | |
|---|---|---|---|
| 3,314,542 | 4/1967 | Kudlaty | 210/323.2 X |
| 3,928,204 | 12/1975 | Thomas | 210/232 |
| 4,105,562 | 8/1978 | Kaplan et al. | 210/323.2 X |
| 4,293,419 | 10/1981 | Sekino et al. | 96/9 X |
| 4,296,951 | 10/1981 | Zimmerly | 285/95 |
| 4,336,043 | 6/1982 | Aonuma et al. | 210/323.2 X |
| 4,352,736 | 10/1982 | Ukai et al. | 96/10 X |
| 4,451,369 | 5/1984 | Sekino et al. | 210/321.9 |
| 4,670,145 | 6/1987 | Edwards | 96/9 X |
| 4,746,430 | 5/1988 | Cooley | 210/321.85 |
| 4,874,405 | 10/1989 | Minhas | 55/158 |
| 5,041,220 | 8/1991 | Lee et al. | 210/321.89 X |
| 5,071,552 | 12/1991 | Bikson et al. | 210/321.89 X |
| 5,137,631 | 8/1992 | Eckman et al. | 210/321.89 X |
| 5,141,637 | 8/1992 | Reed et al. | 210/323.2 X |
| 5,445,731 | 8/1995 | Tuohey et al. | 210/321.9 X |
| 5,470,469 | 11/1995 | Eckman | 96/7 X |
| 5,554,283 | 9/1996 | Brinda et al. | 210/321.89 X |

FOREIGN PATENT DOCUMENTS

| | | | |
|---|---|---|---|
| 0260226 | 9/1988 | Germany | 96/7 |
| 01-027620 | 1/1989 | Japan | 96/9 |

Primary Examiner—Robert Spitzer
Attorney, Agent, or Firm—Thomas K. McBride; John G. Tolomei

[57] ABSTRACT

A separation module uses a series of separation elements with interconnecting hardware that greatly reduces the time necessary for assembly of interconnected elements and the machining or preparation of an extended part of the module inside diameter for acceptance of the elements. The elements use an interconnection between the modules that provides a sliding seal for first engaging adjacent modules and allowing alignment while a secondary seal is brought into contact and locked to provide a rigid axial attachment between the separation elements. The module arrangement further uses a single outer seal near the end of the module into which the separation elements are inserted to reduce the amount of machining, honing, or sleeving necessary to seal the module against by-passing of feed or impermeable components.

35 Claims, 4 Drawing Sheets

SEAL ARRANGEMENT FOR RAPID INTERCONNECTION OR AXIALLY ARRANGED SEPARATION ELEMENTS

FIELD OF THE INVENTION

This invention relates generally to elements for the separation of fluids having components that are permeable and impermeable with respect to a separation material. More specifically, this invention relates to modules for housing a series of axially arranged separation elements.

BACKGROUND OF THE INVENTION

The use of semipermeable separation elements such as membranes find increasing use in making an expanding variety of separations. The basic operations of these systems pass a fluid mixture under relatively high pressure across the surface of a semipermeable membrane which acts as a selective barrier to permit some components of the fluid to pass through more readily than others. The separation of gases in membrane separation processes is generally due to molecular interaction between the gaseous components of the feed and the membrane. This different interaction of components with particular membranes affects the permeation rates so that contact of the feedstream with the membrane must separate particular components. The selective effect can be the result of free molecular diffusion through membrane pores. Such effects are especially seen in applications for small gas molecules such as helium and hydrogen separated from larger gas molecules.

The more common mechanism for membrane separation is thought to be the sorption of the gas component on the feed side of the membrane followed by its diffusion of the component through the membrane with final recovery of the component from the permeate side of the membrane through desorption. This type of separation mechanism is controlled principally by solubility and diffusivity. The membranes through which it occurs are often referred to as non-porous membranes. The terminology "non-porous" is somewhat misleading as, in fact, these membranes do have small pores. Processes for forming these membranes carefully control the size of the pores produced thereby to effectively control the gas transfer of the system. Such systems thereby use a dense control surface that requires elimination of adverse factors such as moisture and chemical degradation and physical distortion.

The variables that affect gas transfer through non-porous membranes include the pressure differential across the membrane, the diffusion rate of the gaseous components, the membrane surface area, and the effective thickness of the membrane. Maximum gaseous diffusion is obtained by using as thin of membrane thickness as possible. Factors that mitigate against the use of thin membranes are the need to maintain a defect-free surface and the need to have a membrane which can withstand high pressures of 3000 lbs/in$^2$ or more across the membrane. Materials for the composition of membranes as well as their forming techniques are well known to those skilled in the art and under constant development.

Commercial gas separation processes are typically operated to recover either a permeate stream that comprises a stream having an increased concentration of the permeate components relative to the feedstream and a residue stream, also referred to as a "retantate stream," which is the remainder of the feedstream that has not permeated the membrane. The desired product stream for these processes can comprise either the permeate or the retantate stream. Increases in the purity or the separation rate of either the retantate or permeate can be obtained by adjusting the relative pressure difference between the feed side and the permeate side as well as adjusting the partial pressures of the more permeable gaseous components on the feed side relative to the permeate side.

In many processes the retantate stream is actually the desired product stream. Examples of this are in $CO_2$ and $H_2S$ removal from a hydrocarbon mixture such as natural gas. The desired purity of the retantate or permeate is further improved by contacting either the permeate or retantate through multiple stages of separation. In this manner, each separation stage of the recovered stream that is passed through an additional separation element again produces a yet further separation of the desired component and a higher concentration thereof. Multiple separation steps can also be used with different semipermeable materials or membranes in series to withdraw different components from a feedstream or permeate stream.

The use of multiple separation steps in series or parallel is facilitated by a specific membrane arrangement. The well known spiral-wound membrane arrangements are used commercially in many fluid separation processes. The spiral-wound membrane provides a large contact area in a very compact form. Spiral-wound membranes are typically formed by wrapping one or preferably more sheets of membrane material around a central conduit containing holes for recovery of a central permeate stream. Spacers or other devices can be used to maintain feed/retantate channels through which the feed mixture passes and is separated into the excluded retantate components or permeate components that pass through the membrane surface.

Regardless of the type of separation element in use, it is highly desirable to be able to interconnect elements to provide multiple stages of separation. A well known interconnection arrangement couples cylindrical separation elements into an elongated separation module usually contained within a cylindrical pressure vessel. U.S. Pat. No. 4,874,405 shows such an arrangement where separation elements are interconnected by an impervious, flexible coupling that is clamped to an outer circumference of the separation elements to isolate a feed/retantate stream and an inner coupling provides interconnection between central tubes that collect permeate from the elements in series. In this manner the elements are interconntected for segregated axial flow of the two fluid streams between elements. The couplings as well as the flexible elements must be assembled and clamped in place as the axial string of elements is inserted into the vessel of the module. The '405 patent seems to be typical of the prior art which shows the segregation of fluid flow between elements through a central interconnection of the permeate tube.

Other examples of such element arrangements are shown in U.S. Pat. Nos. 4,746,430, 4,296,951 and 3,928,204. These patents show a variety of different interconnection methods for connecting the central permeate tubes between adjacent elements. These elements use a relatively large pipe, usually about 8 inches in diameter, together with seals around the circumference of the separation elements to segregate the communication of feed or retantate between the stages of separation along any gap or passage left between the elements and the vessel wall of the module. Providing multiple seals of this sort between the vessel wall and the outside of the separation element raises the cost of the modules by requiring the use of a smooth surface wall to cooperate with seals on the filter elements that contact the inside of the module vessel wall. Honing or polishing of these surfaces adds considerable expense to the fabrication of separation modules. U.S. Pat. No. 4,746,430 eliminates some of this cost by using a smooth sleeve or liner inserted into the housing to provide a more cost effective method of presenting a smooth surface to the outer seals on the filter elements. Nevertheless, the need for smooth surfaces along the bore of the module vessel still imposes additional cost on the modules.

A further drawback of using modules containing a series of separation elements has been the time and effort required to assemble such modules. A modular installation can typically contain 200 modules with from 6 to 10 elements in each module. The assembly of this number of modules by insertion of multiple modules takes considerable time due to the method of installation. Each series of filter elements is typically installed one-at-a-time from one end of a module vessel. Therefore, each separation element must be slid down the module, interconnected with another element which is again slid down the bore of the module vessel for continued connection and insertion of each module. The amount of time required to make the interconnection between adjacent separation elements must be multiplied by the total number of elements; therefore, arrangements of filter elements that reduce the time for interconnection can provide substantial benefits to the installation and cost effectiveness of using serial separation elements in elongated separation modules.

More important than additional time taken to load previous modular assemblies, the previous methods of interconnection do not make the best use of space or contribute to the overall bending strength of the element string. Interconnection of the individual modules across a small central connection adds length to the overall module string. Any additional space needed for connections reduces the separation area of the modules. Clamps and spacers between elements for interconnection can add 6 inches or more to the space between modules—that is 6 inches per module that is not available for separation.

The connections across the relatively small central conduit does little to restrain bending across the string of elements. The small conduit has an inherent small section modulus which is unable to resist deflection of the string under bending moments.

SUMMARY OF THE INVENTION

Accordingly, an object of this invention is to reduce the time required to interconnect separation elements during assembly of separation modules.

Another object of this invention is to reduce or eliminate the need for sleeves or honing and polishing the interior bore of module pressure vessels to provide a suitable sealing surface along its length.

A further object of this invention is to provide an interconnection arrangement that reduces the space required for interconnecting elements.

A yet further object of this invention is to provide an interconnection arrangement that provides a stronger element string with increased bending moment resistance.

This invention solves the problems of providing smooth surfaces on vessel walls, reducing the length required to interconnect elements, and reducing long times for interconnecting elements by using a pair of seals between elements that segregates the flow of permeate fluid from the feed/retantate while also segregating the feed/retantate from flowing along the pressure vessel wall between elements. The combination uses two seals that permit relative movement between the separation elements for interlocking the elements while one of the seals is engaged to align the elements. Typically, the elements are interlocked together by rotating adjacent elements relative to each other thereby locking elements in place and maintaining seal pressure between the two seals. The types of seals that will be used usually comprise gasketed seals that maintain radial or axial pressure between contacting sealing surfaces for segregating the permeate and retantate fluid flows. The seal arrangement also preferably incorporates a detent system for preventing unwanted relative movement between the separation elements, movement that can cause disengagement after they have been locked together.

Particular forms of this invention can be particularly helpful for saving module space and increasing the strength of element interconnections. The interconnection can employ interlocking elements that are relatively flush with the outer ends of the elements and contacting seals that require little engagement length. The short seals and flush design of the interlocking elements can reduce the length of the connections between modules by as much as five inches relative to those currently in use. With 6 to 10 elements normally in a module the savings in space can permit the addition of at least one extra element in a typical module. Additional bending strength can be incorporated into the interconnected string of elements by locating one of the interlocking elements at the outer diameter of the element so that the interconnection can provide a relatively large section modulus that will reduce the bending deflection.

Accordingly, in one embodiment, this invention is a separation element for joining adjacent separation elements together into a string of multiple elements in an elongated separation module. The separation elements include a permeable separation body arranged to provide permeate channels in communication with one side of the separation body and retantate channels in communication with the other side of the separation body. The permeate channels collect separated permeate for passage into a permeate passageway and the retantate channels distribute or collect retantate for communication with retantate separation passageways. The permeate passageway communicates with a permeate connection located at one end of the separation element. The retantate passage communicates with a retantate connection located at the same end of the separation element. A first seal structure is located about the retantate connection for providing sealing of the element with an adjacent element. A second seal structure is located about the permeate connection. The first or second seal structure establishes a slidable seal between the adjacent elements for permitting relative movement between the elements and the adjacent elements are engaged across at least one of the seal structures. An axial restraint keeps adjacent elements in engagement and maintains the adjacent elements in sealed contact about the first and second seal structures.

Another embodiment of this invention is a seal housing for sealing a separation element in a vessel wherein the separation element is of the type comprising a permeable separation body in communication with a permeate passageway that delivers permeate to a permeate connection at one end of the element and in communication with a retantate passage that communicates with a retantate connection at the same end of the element. The retantate connection delivers or withdraws feed or retantate from the element. The element defines a seal structure at the retantate connection or the permeate connection for establishing a slidable seal with the housing for permitting relative movement between the element and the housing when they are engaged across at least one of the seals. The element also includes an axial restraint for engaging the element and the housing in sealed contact. The housing further includes a housing retantate connection and a housing permeate connection defined by the housing and a vessel seal surface bordering the perimeter of the housing and surrounding the housing retantate connection and the housing permeate connection. A first seal structure and a second seal structure are retained by the housing at the housing retantate connection and the housing permeate connection. One of the seal structures permits a sliding seal to be established that permits relative movement between the element and the housing when the element and the housing are engaged across at least one of the seal structures. A housing axial restraint engages a cooperating axial restraint on the element and maintains the element and housing in sealed contact across the first and second seal structures.

In a further embodiment, this invention is a module for containing a plurality of interconnected separation elements. The module includes an elongated vessel, a plurality of axially extended separation elements located within the vessel and a seal housing located at the outside end of the outermost element. The separation elements are serially interconnected to maintain segregated axial flow of at least two fluids between adjacent elements. The elements are interconnected by a first element seal that maintains segregation of a first fluid and by a second element seal that maintains segregation of a second fluid. The second element seal permits relative movement between the elements during interconnection when one of the first or second seals is engaged therewith. These separation elements also include an inter element axial restraint that engages adjacent elements and maintains sealing contact between the elements at the first and second element seals. A seal housing is located at an outside end of the outermost element and has sealed communication with a permeate outlet and with a feed inlet or retantate outlet. The housing has a seal surface located about the periphery of the housing for establishing a seal between the vessel and the periphery of the housing and an axial interconnection for engaging the series of interconnected separation elements through the outermost element.

Additional objects, embodiments, and details of this invention will be disclosed in the following detailed description of the invention.

DETAILED DESCRIPTION OF THE PREFERRED EMBODIMENT

The most essential part of the module of this invention is the separation element. The invention can use any type of separation element that has a surface permeable to one component in a fluid stream and impermeable to another component in the fluid stream. Suitable separation elements may use any type of effective separation material in any arrangement that provides a suitable channel or channels for the passage of the fluid containing the permeable and impermeable components along one side of the separation material and a channel or channels for collection of the permeable components from an opposite side of the separation material. Suitable channels for permeate and retantate can have radial, spiral, or other configurations that can pass the fluid containing the permeable and impermeable fluids axially into and axially out of the separation element while collecting the permeate fluid and passing it axially out of the separation element. Flow through the separation element is preferably arranged such that there is coaxial flow with the permeate flow in the central portion of the element. However, the arrangement of this invention can be used with separation elements where one or both flows are passed axially through the element from off center inlet and outlet points. Suitable separation elements of this type in a variety of configurations are well known to those skilled in the art and with specific examples described in the previously mentioned patents.

One exact form of this invention can be more fully appreciated by reference to the figures. The further description of this invention in the context of the figures is not meant to limit it to the details shown therein. Additional variations for specific parts of the apparatus of this invention are described in conjunction with the figures, but are not meant to provide the only alternatives that can be used. Additional alternatives will be well appreciated by those skilled in the art from the description contained herein.

Figure 1:
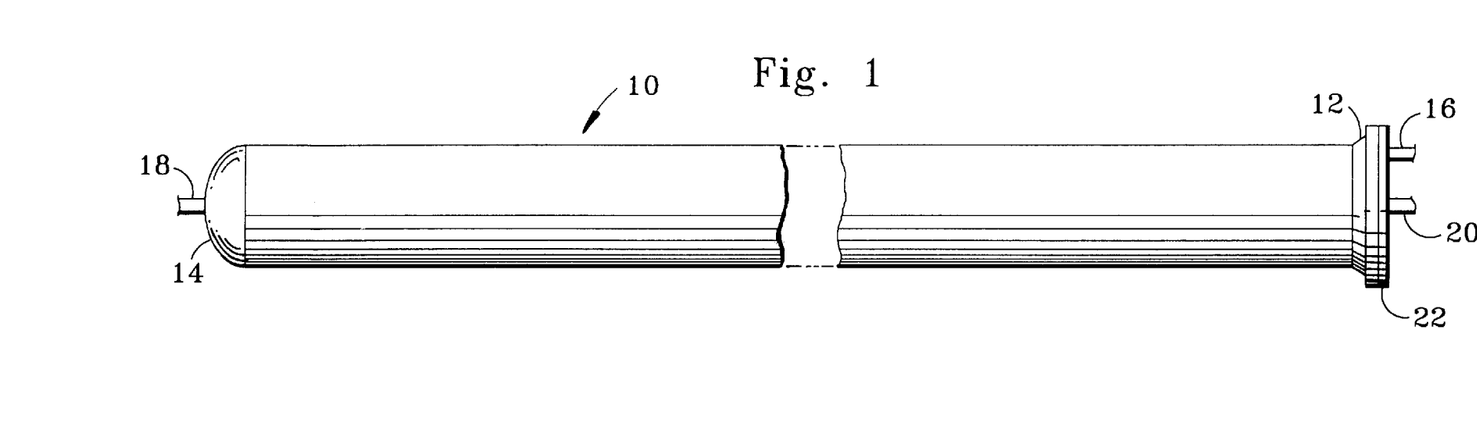
FIG. 1 shows the outside of a typical adsorption module.

Looking then at the drawings, FIG. 1 shows a basic separation module generally at 10 having a flanged end 12 and a fixed closure 14 at an opposite end. In operation, feed can enter module 10 at either end through one of nozzles 16 or 18. The other of nozzles 16 or 18 serves as an outlet for the non-permeate component or retantate as it is called in this application. In most cases, feed will enter nozzle 16; retantate will leave through nozzle 18; and a permeate component will flow out of the module through a nozzle 20. To load and unload separation elements from the interior of module 10, a removable closure such as blind flange 22 will seal at least one end. Removal of blind flange 22 opens the interior of the module for insertion or withdrawal of separation elements located therein.

In alternate arrangements, separation elements may be loaded from both sides of the module by providing blind flanges or other such removable closures at both ends. In this type of arrangement, a nozzle is usually provided at the center portion of the module to supply feed or withdraw retantate with the other of the feed or retantate being supplied or withdrawn at both ends.

Figure 2:
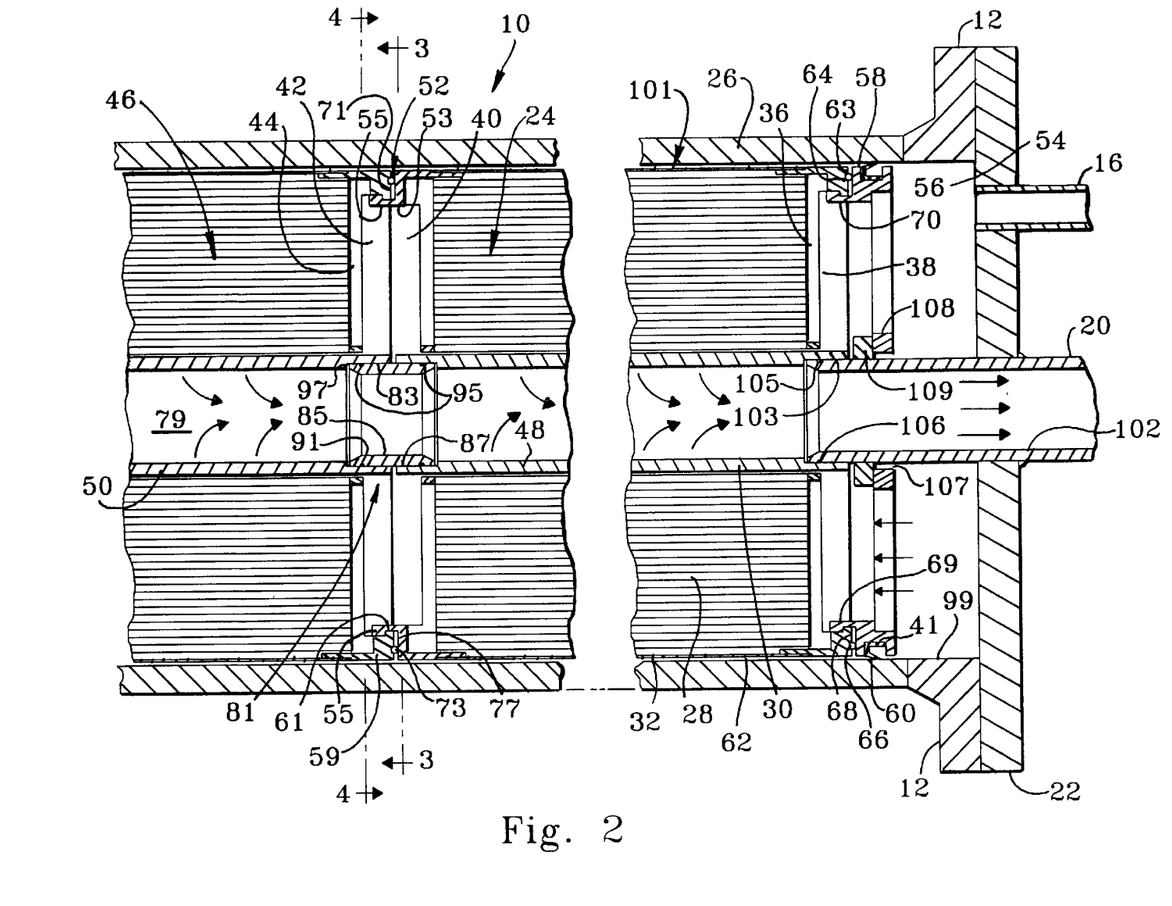
FIG. 2 is a partial cross-section of the module shown in FIG. 1.

The arrangement of the filter elements in the module is illustrated in FIG. 2. FIG. 2 shows a typical separation element 24 located in shell 26 of module 10. Separation element 24 comprises a spiral-wound membrane 28 wrapped about a central conduit 30 and providing a permeable separation body having an outer circumference 32. Feed entering the module through nozzle 16 flows into the module and through an inlet 38 of separation element 24 and into a distribution chamber 36 that serves as a distribution passageway. The feed flows from the passageway of chamber 36 through channels formed by the spiral-wound membrane 28. Impermeable portions of the feed continue to flow axially through membrane 28 into a collection passageway in the form of a chamber 40 for flow into an inlet 42 and a distribution chamber 44 of an adjacent separation element 46. As the feed continues to flow through the channels, it becomes more concentrated in the non-permeable or retantate components. The permeable components flow across the membrane 28 and into channels that deliver fluid to a permeate passage in the form a central permeate conduit 48. The permeate channels defined by the membrane delivers fluid across openings in the permeate conduit 48 (not shown). Permeate from adjacent separation element 46 flows from a permeate conduit 50 into permeate conduit 48 and out of the module through permeate conduit 20. After flow through all of the permeate passages in module 10, retantate is collected from the end of the module through nozzle 18 as shown in FIG. 1.

The interconnection assembly 52 between the separation elements 46 and 24 is a key feature of the invention. The interconnection assembly 52 seals adjacent separation elements to maintain segregation of the feed/retantate and permeate streams. A typical seal between the adjacent separation elements 24 and 46 seals the annular outlet 42 with chamber 44 to prevent by-passing of feed/retantate into an annular section 62 located between the outside of the separation elements and the inside of vessel wall 26. The seal structure of interconnection assembly 52, as shown in FIG. 2, is composed of a male portion 53 having curved segments 55 that extend through inlet 42 and a female locking ring 59 that encircles the outside of separation element 46. Rings 59 and 53 may be referred to as retantate connections.

Figure 3:
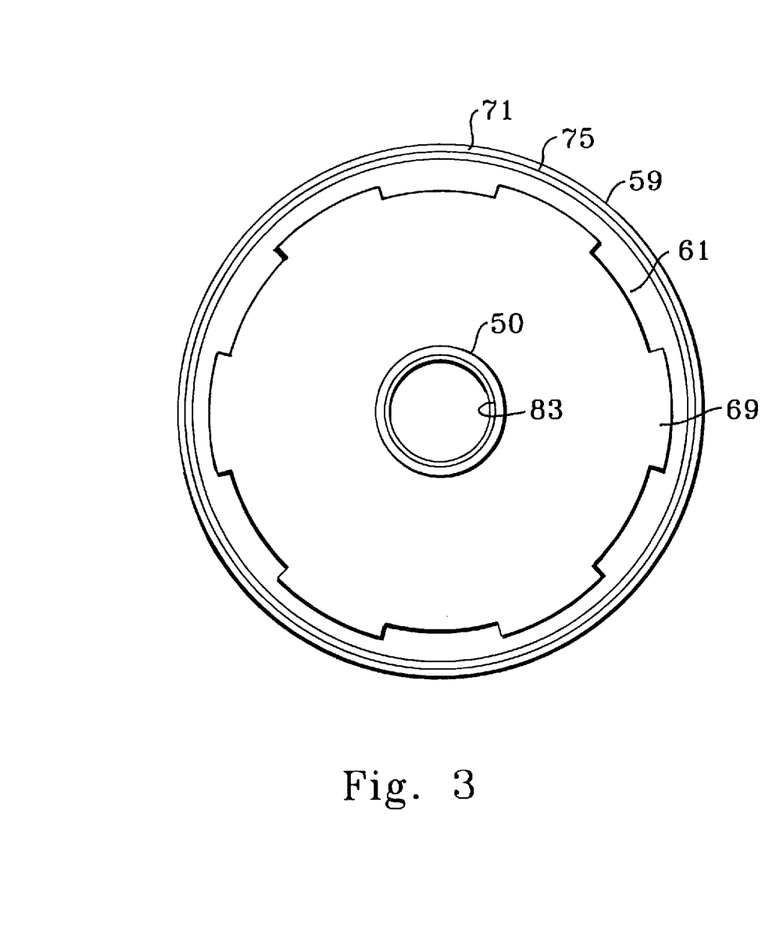
FIG. 3 is a section of FIG. 2 taken at lines 3—3 and showing one end of a separation element with the vessel omitted.
Figure 4:
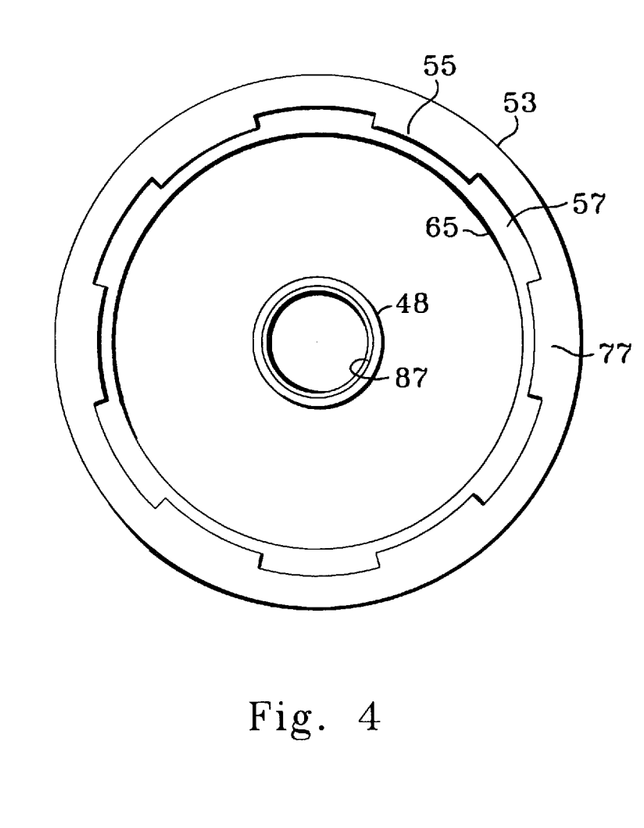
FIG. 4 is a section of FIG. 2 taken at lines 4—4 and shows the end of the separation element that is adjacent to the separation element of FIG. 3.

Locking ring 59 defines a series of circumferentially extending slots through which curved segments 55 pass for engagement with an inwardly extending ledges 61. FIG. 3 and FIG. 4 more clearly depict the slots, ledges, and curved segments that are used to engage separation element 24 with separation element 46. Looking then at FIG. 4, locking ring 53 has curved segments 55 extending inwardly around the inner opening 65 of chamber 40. Slots 57 are equally spaced between segments 55. Looking then at FIG. 3, the ring 59 defines a series of evenly spaced ledges 61 and slots 69 that are spaced to accept curved segments 55 as shown in FIG. 2. Once the curved segments 55 pass through the slots 69, the two elements 46 and 24 are rotated with respect to each other to engage ledges 61 with curved segments 55 in a locking arrangement.

Ring 59 also defines a contact face 71 that retains an O-ring 73 in a groove 75. Insertion of the curved segments 55 through the slots 69 of ring 59 brings O-ring 73 into contact with an annular sealing surface 77 that extends around the outside of ring 53. Segments 55 and ledges 61 may be angled as desired to provide any desired amount of axial pressure on O-ring 73 by relative rotation between separation elements 46 and 24.

The inside circumference of inlet 42 is segregated from the permeate flow passing through the central part 79 of permeate column 50 by a sliding seal arrangement 81. Sliding seal arrangement 81 includes an end groove 83 having a smooth surface defined on the inside radius of permeate conduit 50. Grove 83 receives an interconnect pipe 85 that also extends into a similar groove 87 defined in the adjacent end of permeate conduit 48. The bores defined by grooves 83 and 87 at the separation element ends can be referred to as permeate connections. Interconnect pipe 85 defines spaced apart grooves 95 that each retain an O-ring 91. O-rings 91 are arranged to segregate the permeate and the retantate fluids by sealing O-rings 91 through confining radial pressure applied to the outside of the O-ring by grooves 83 and 87.

The outermost portion 101 of the separation elements may be provided with a shroud such as an impermeable layer or covering that will prevent any by-passing of feed or retantate from the outermost channel of the spiral wound element 28 into the annular space 62. Such shrouding or covering may also be possible to use a suitable coating, such as an epoxy, or layering of sufficient layer of permeable material on the outside 101 of the separation elements 28 to prevent or substantially inhibit any by-passing of the feed or retantate into the outer annular space 62. A suitable sealing cover on the outside of separation element can also be provided in a spiral wound membrane by saturating the outside of the membrane with suitable sealing resin. The shroud or outer cover provided around the separation element 101 can also protect the element from damage.

A combination of the sliding seal provided by seal arrangement 81, the additional seal provided by interconnection assembly 52, and the locking mechanism provided by rings 59 and 53 of interconnection assembly 52 are the essential features of the invention. The sliding seal provided in one particular form by interconnect pipe 85 facilitates the initial alignment of separation elements as they are stacked axially together and slid down the inside of module 10. In the typical loading arrangement where separation element 46 has been extended into the inside of module 10 and separation element 24 is the next to be installed in the series of modules, the interconnect pipe 85 is the first piece to make contact with the adjacent element. In the loading operation, blind flange 22 is not present and the outer end of separation element 46 is left extending outside of blind flange 12. Installation of separation element 24 into the series of elements is first begun by sliding interconnect nipple 85 into the bore defined by groove 83. A ledge 97 at the back of groove 83 holds about half of interconnect pipe 85 out past permeate tube 50. Interconnect nipple 85 aligns separation element 24 as the permeate conduit 48 is pushed over the extended end of interconnect pipe 85. Engagement of interconnect nipple 85 with the bore of groove 87 allows relative movement between separation elements 46 and 24 as element 24 is rotated to align curved segments 55 with slots 59 and moved axially to extend curved segments 55 through slots 69. Once the segments and slots are properly aligned, continued sliding of separation element 24 along interconnect pipe 85 provides a rapid interconnection of the adjacent separation elements. The separation elements are then quickly rotated relative to each other to lock the interconnection. Once locked, the string of elements including separation elements 46 and 24 may be pushed in for the addition of another separation element to the opposite end of permeate tube 48.

When, as depicted by FIG. 2, separation element 24 is the last separation element, a seal housing 58 may be inserted into the end of the outermost separation element. Seal housing 58 provides a seal between the outer wall of module 10 and the chamber 54 that distributes feed to the interconnected elements. A seal structure similar to the central interconnection between adjacent modules can be placed at outer end of module 24 to prevent feed and retantate from entering passage 62. As feed first enters the module through nozzle 16, chamber 54 distributes feed to the inlet 38 of the separation element 24 as previously described. Feed and retenate flow from chamber 54 across an inlet 56 of a seal housing 58. Seal housing 58 provides a transverse groove 41 that retains a lip seal 60 around its outer periphery. Lip seal 60 prevents feed or retantate from flowing into the annular space 62. Sealing flow from the outer annular area 62 prevents any initial by-passing of feed and retantate around the separation elements. By-passing of retantate or permeate around the inlet face of seal housing 58 is prevented by a seal structure that has a seal face 63 with a groove 64 for retaining an O-ring 66. O-ring 66 contacts a seal face 68 on an inner face of the seal housing. A curved segment 69 extends in through inlet 38 through a slot (not shown) to engaged an inwardly extending ledge 70 in the same manner as described for the seal structure on interconnection assembly 52.

The outside portion of lip seal 60 contacts a limited smooth bore portion 99 located near the flange portion of module 10. The smooth bore portion need only extend inwardly through module 10 by the amount that lip seal 60 will extend into module 10. The smooth bore portion is provided to maintain a fluid tight seal between lip seal 60 and the inside of module 10 and to prevent damage to the lip seal. Only the portion of module 10 contacted by lip seal 60 needs to have the smooth bore and this portion is limited since the seal housing is only inserted on the outermost module which is located near the flanged end 12 of module 10. Accordingly, by this arrangement, it is only necessary to machine or hone a small portion of the inside of module 10. The reduced amount of machining required on the inside of module 10 simplifies fabrication of the module.

In addition, since there is only one seal portion formed between the inside of module 10 and the series of separation elements, the additional clearance between the outside 101 of the separation elements and the outside of the connection seals 52 may be increased. The increased clearance allows the string of separation elements to be easily inserted into and withdrawn from the module 10 without excessive force. It may be desirable to put a temporary sleeve on at least the lower portion of module 10 at its inlet to protect the honed surface during the installation of the separation elements prior to the assembly and insertion of the seal housing.

The final connection of the permeate conduit 48 to the outside of the module is accomplished through a permeate tube 102. Permeate tube 102 extends into an annular groove 103 that extends around the inside of permeate tube 48 and provides a machined bore for receiving permeate tube 102 in the manner previously described in connection with the interconnect pipes. Permeate tube 102 segregates the feed and retantate from the permeate by exerting radially confining pressure on O-ring 106 that is retained in groove 105. Permeate tube 102 is fixed to blind flange 22 and may be inserted into permeate conduit 48 as the final assembly piece in putting together module 10.

Seal housing 58 may also be used to facilitate the insertion and withdrawal of the string of modules. Preferably, seal housing 58 will provide a permeate connection 108 which defines an opening 107. Permeate connection 108 can act in conjunction with permeate tube 102 and a collar 109 to retain the permeate tube 102 in connection with the permeate conduit 48. Collar 109 is clamped or bolted by suitable means around the outer perimeter of permeate tube 102 after passing tube 102 through opening 107. In this manner, collar 109 prevents withdrawal of the permeate tube from housing 58 when blind flange 22 is removed from module 10. As blind flange 22 is pulled away from the module, the string of separation elements is carried with it. Suitable clearance is provided for installing seal housing 58 when blind flange 102 is secured with collar 109 by leaving separation element 24 sufficiently withdrawn from module 10 to permit the necessary engaging movement of seal housing 58 relative to the end of separation element 24. Tube 102 can serve as an axial restraint for the housing as well as means for withdrawing the housing and the interconnected separation elements from module 10.

Figure 5:
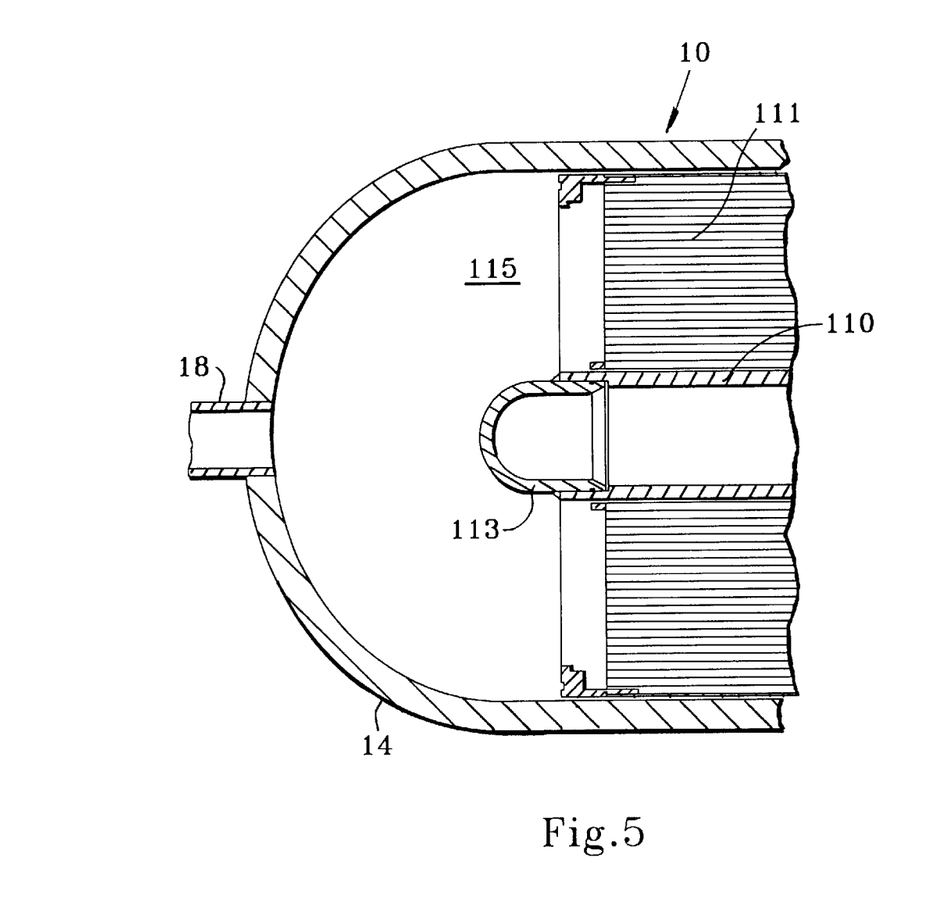
FIG. 5 is a partial view showing the terminal end of a filter element in a module.

Permeate tube 102 provides a seal at one end of the string of permeate conduits 48 and 50. As shown in FIG. 5, the opposite end of the permeate conduit may be sealed by an appropriate means. In FIG. 5, a permeate conduit 110 of innermost separation element 111 has a plug 113 retained therein to seal the back end of the permeate flow path from the retantate or 10 feed in the volume 115 at the end of separation module 10.

The invention shown in the single embodiment is susceptible to a wide variety of variations. The invention may use any combination of seals that allows relative movement between the modules for facilitating the locking of the modules together and aligning the connections between the modules to maintain alignment of the modules while they are being locked and a locking structure that secures the modules together with sealing contact to maintain the feed/retantate fluids segregated from the permeate fluid.

One of the gasket structures of the invention may be arranged to provide a detent with locking arrangement. For example, the gasket structure of the interconnection assembly 52 or the gasket 66 of the seal housing may be arranged such that the axial displacement of an O-ring provides a biasing force. For example, gasket 73 may be used to provide a biasing force for a detent that maintains the separation elements 46 and 24 in locked relationship. A suitable detent may comprise small radially extended grooves with cooperating lands on the contacting surfaces of curved segments 55 and extended ledges 61.

Lateral alignment of the adjacent elements is most advantageously provided by the interconnect pipe and tubes shown in FIG. 2 which allows relative axial movement between the elements while maintaining a seal across permeate tubes 50 and 48. Thus, this arrangement is summarized as providing an axial seal suitable for relative sliding movements between the separation elements while a surrounding axial seal also provides means for locking the adjacent elements together. Alternate arrangements could use two sliding seals by rearranging the axial seal provided by O-ring 73 to be retained in a suitable groove for radial confinement.

In addition, the structure for the locking means may be independent from the structure for the seals. In a farther departure from the embodiment, chamber 44 may have an annular closing that provides an offset nozzle for retantate/feed between each separation element. These offset nozzles may have an open slot for receiving a mating nozzle from an adjacent separation element. The outside of the nozzle may have a top retainer for trapping the mating nozzle so that the locking is achieved by sliding the nozzles into contact with each other across an axially displaced gasket that provides sealing force between the nozzles. In such an arrangement, the sliding seal provided by interconnect pipe 85 may be replaced by an axially displaced seal that receives sealing pressure by force developed through the trapping action of the outer permeate nozzles. Alignment in such an arrangement may be farther facilitated by having an extended central ring that surrounds an adjacent permeate tube to keep the adjacent separation element centered as separation elements are rotated relative to each other.

The end seal arrangements of this invention are also susceptible to significant variations. The seal housing 58, as an independent element, may be eliminated and incorporated into the end of a final seal element. Such a final element would have a groove for a lip seal that could be provided on the end of a retaining ring for holding a permeate tube of an outer sealing flange. In addition, it may be possible to eliminate the lip seal arrangement and instead use a seal housing that has an outer sealing surface that extends between flanges 12 and 22 and forms a seal therewith. It is also possible to incorporate both the permeate tube 102 and the seal housing into blind flange 22 by welding or the use of another seal structure. In this manner the outer seal to prevent by-passing along annular section 62 can be provided by a single seal between outer flange 12 and blind flange 22.

What is claimed is:

1. A separation element for joining adjacent separation elements into a string of multiple elements in an elongated separation module, said separation element comprising:

a permeable separation body;

a permeate channel in communication with a first side of said separation body for collecting separated permeate;

a permeate passage in communication with said permeate channel for communicating said permeate channel with one side of the element;

a retantate channel on a second side of said permeable separation body for distributing feed to said body and conducting retantate from said body;

a retantate passage communicating said retantate channel with at least one end of said element;

a retantate connection at one end of said element communicating with said retantate passage;

a permeate connection at said one end of said element communicating with said permeate passage;

a first seal structure located about said retantate connection for providing sealing of the element with an adjacent element and a second seal structure located about said permeate connection, at least one of said first and second seal structures establishing a slidable seal between adjacent elements for permitting relative movement between elements while adjacent elements are engaged across at least one of said seal structures; and, an axial restraint for engaging adjacent elements and maintaining the adjacent element in sealed contact about said first and second seal structures.

2. The element of claim 1 wherein said permeable separation body comprises a spiral wound membrane.

3. The element of claim 2 wherein a shroud having a degree of impermeablility at least equal to the spiral wound membrane surrounds the outside of said spiral wound membrane.

4. The element of claim 2 wherein said retantate passage comprises an annular volume at a longitudinal end of said spiral wound membrane.

5. The element of claim 1 wherein the permeate passage comprises a central permeate conduit.

6. The element of claim 1 wherein said element has an outer perimeter and said retantate connection extends substantially around the outer perimeter of said element.

7. The element of claim 1 wherein said slidable seal comprises a cylindrical surface having a centerline parallel to the centerline of said element and said surface is adapted to provide radial sealing pressure to a gasket for permitting relative axial movement between adjacent modules during installation.

8. The element of claim 1 wherein said first seal structure comprises an annularly extended surface and said surface is adapted to provide axial sealing pressure to a gasket.

9. The element of claim 8 wherein said first seal structure is adapted to provide said axial restraint.

10. A separation element for use in series to join adjacent elements into a string of multiple elements in an elongated separation module, said element comprising:

an annular separation body made of permeable separation material and defining a permeate channel for collecting separated permeate and defining a retantate channel for distributing feed to said body and conducting retantate from said body said separation body having a central axis;

a permeate conduit extending coaxially with the central axis of said separation body and in communication with said permeate channel;

a first retantate chamber and a second retantate chamber at, respectively, a first end and a second end of said separation body;

first and second retantate connections at, respectively, said first and second ends of said element, said first and second connections communicating, respectively, with said first and said second retantate chambers, both retantate connections defining either an axially restraining seal having an axial seal surface for supplying axial sealing pressure with a cooperating surface on an adjacent element and having an axial restraint for cooperating with the type of axial restraint at the opposite end of the element and axially restraining an adjacent element or defining a radial seal having a radial seal surface for supplying radial sealing pressure with a cooperating surface associated with an adjacent element; and first and second permeate connections at, respectively, first and second ends of said permeate conduit, said first and second permeate connections defining a radial seal where the retantate connections define an axially restraining seal or defining an axially restraining seal where the retantate connections define a radial seal.

11. The element of claim 10 wherein said annular separation body comprises a spiral wound membrane.

12. The element of claim 11 wherein a shroud having a degree of impermeablility at least equal to the spiral wound membrane surrounds the outside of said spiral wound membrane.

13. The element of claim 10 wherein said first and second retantate connections surround, respectively, the first and second retantate chambers.

14. The element of claim 10 wherein said axially restraining seal and said radial seal are adapted to provide pressure to an O-ring gasket.

15. The element of claim 10 wherein said axially restraining seal includes a structure that provides a detent for restraining disengagement of adjacent modules.

16. The element of claim 10 wherein said radial seal defines a first circumferential band that is adapted to be surrounded by or surround a second circumferential band defined by an interconnect tube for radially compressing an O-ring gasket between said first and second bands.

17. The element of claim 16 wherein said interconnect tube is not an integral part of said element.

18. A seal housing for sealing a separation element in a vessel wherein the separation element is of the type comprising a permeable separation body in communication with a permeate passage that delivers permeate to a permeate connection at one end of the element and in communication with a retantate passage that communicates with a retantate connection at the same end of the element for delivering or withdrawing feed or retantate and the separation element defines separate seal structures establishing a slidable seal with the seal housing for permitting relative movement between the separation element and the housing when the seal housing and separation element are engaged across at least one of the seal structures and at least one of the seal structures defines an element axial restraint for engaging the separation element and the seal housing in sealed contact across the seal structures, said seal housing comprising:

a housing retantate connection defined by said housing;

a housing permeate connection defined by said housing;

a vessel seal surface bordering the perimeter of said housing and surrounding said housing retantate connection and said housing permeate connection;

a first seal structure providing a sliding seal structure retained by said housing at said housing retantate connection or said housing permeate connection and cooperating with the corresponding permeate or retantate connection on the element;

a second seal structure retained by said housing at the other of said housing retantate connection or said housing permeate connection and cooperating with the corresponding permeate or retantate connection on the element; and, a housing axial restraint for engaging the cooperating element axial restraint on said element and maintaining the element and housing in sealed contact across the first and second seal structures.

19. The housing of claim 18 wherein the housing retantate connection surrounds said housing permeate connection and defines the first or second seal structure as an integral part of said housing.

20. The housing of claim 19 wherein said permeate connection retains said first seal structure, the first seal structure is to act in conjunction with said housing permeate connection to retain the first seal structure in the permeate connection on the element, said housing defines said second seal structure as an integral part of said seal structure, and said second seal structure defines said housing axial restraint.

21. The housing of claim 20 wherein said second structure defines an annular surface for axially compressing an O-ring and variable compression of said O-ring provides a biasing force for operation of a detent that keeps the element engaged with the seal housing.

22. The housing of claim 18 wherein said vessel seal surface is formed to be retained completely in said vessel and retains a gasket to impose a radial sealing force between the inner wall of the vessel and the outer circumference of the housing.

23. The housing of claim 22 wherein said gasket is a lip seal type gasket.

24. A module for containing a plurality of interconnected separation elements said module comprising:

an elongated vessel;

a plurality of axially extended separation elements located within said vessel and serially interconnected to maintain segregated axial flow of at least two fluids between adjacent elements, said elements being interconnected by a first element seal that maintains segregation of a first fluid of said at least two fluids, by a second element seal that maintains segregation of a second fluid of said at least two fluids and permits relative movement between the elements during interconnection when one of said first or second element seal is engaged and by an interelement axial restraint that engages adjacent elements and maintains sealing contact between the elements at said first and second element seals when arranged in a locking position; and, a seal housing located at the outside end of an outermost element having sealed communication with a permeate outlet and with one of a feed inlet or a retantate outlet, having a housing seal surface located about the periphery of said seal housing for establishing a seal between said vessel and the periphery of said housing and an axial interconnection for engaging the series of interconnected separation elements through the outermost element.

25. The module of claim 24 wherein said seal housing is independent of said outermost element, said seal housing contains a first housing seal and a second housing seal that cooperate with said first element seal and said second element seal on said outermost element to provide sealed communication to said permeate outlet and to said feed or retantate connection and said axial interconnection can engage and disengage the axial restraint of said outermost element.

26. The module of claim 24 wherein said vessel has a relatively smooth bore section formed at at least one end and said seal housing retains a gasket about its circumference that is radially compressed by contact with said bore section.

27. The module of claim 26 wherein said smooth bore section has a length that is less than the diameter of the vessel.

28. The module of claim 26 wherein a housing interconnect tube extends between said housing and said outermost element to establish said second element seal and a detachable collar encircles the housing interconnect tube to engage said seal housing and permit withdrawal of said plurality of interconnected separation elements from said vessel.

29. The module of claim 26 wherein said first element seal and said seal housing are defined by a seal structure that provides said interelement axial restraint.

30. The module of claim 29 wherein said seal structure has an annular surface for axially compressing a gasket and said second element seal has a cylindrical surface for radially compressing a gasket and providing relative axial movement between said module and another module.

31. The module of claim 30 wherein said seal structure provides a detent arranged such that axial compression of said gasket provides a biasing force for said detent.

32. The module of claim 30 wherein said cylindrical surface is defined in said second element seal by a permeate conduit that extends through the center of the element.

33. The module of claim 24 wherein said elements contain spiral wound separation elements.

34. The module of claim 24 wherein an element interconnect tube extends between elements to establish said second element seal.

35. The module of claim 24 wherein said first element seal coaxially surrounds said second element seal for coaxial segregated fluid flow through said elements.

* * * * *